(12) United States Patent
Yen

(10) Patent No.: US 7,464,911 B1
(45) Date of Patent: Dec. 16, 2008

(54) PERSONAL ITEM HANGER

(76) Inventor: Elton Yen, 13460 Brooks Dr., Baldwin Park, CA (US) 91706

( * ) Notice: Subject to any disclaimer, the term of this patent is extended or adjusted under 35 U.S.C. 154(b) by 0 days.

(21) Appl. No.: 11/891,557

(22) Filed: Aug. 9, 2007

(51) Int. Cl.
*F16B 45/00* (2006.01)

(52) U.S. Cl. ..................... 248/304; 248/914

(58) Field of Classification Search .......... 248/304, 248/317, 339, 914
See application file for complete search history.

(56) References Cited

U.S. PATENT DOCUMENTS

| | | | | |
|---|---|---|---|---|
| 2,473,086 A | * | 6/1949 | Montero ............ | 248/308 |
| 2,532,255 A | * | 11/1950 | Davis ............ | 248/215 |
| 5,301,912 A | * | 4/1994 | Chang ............ | 248/221.11 |
| 7,219,868 B2 | * | 5/2007 | Marler et al. ........ | 248/304 |
| 7,322,554 B2 | * | 1/2008 | Caroselli et al. ...... | 248/304 |
| 7,389,966 B1 | * | 6/2008 | Hunter ............ | 248/304 |
| 2004/0195484 A1 | * | 10/2004 | Sheeran ............ | 248/304 |
| 2005/0161570 A1 | * | 7/2005 | Bauerly ............ | 248/317 |
| 2006/0108497 A1 | * | 5/2006 | Miranda ............ | 248/690 |
| 2008/0042032 A1 | * | 2/2008 | Yap et al. .......... | 248/304 |

* cited by examiner

*Primary Examiner*—Ramon O Ramirez
(74) *Attorney, Agent, or Firm*—Raymond Y. Chan; David and Raymond Patent Firm

(57) ABSTRACT

A personal item hanger for hanging a personal item below a table, includes a retention body for being rested on a top surface of the table, and an extension arm having an adjustable length and including an upper coupling end rotatably coupling with the retention body and a lower hooking end downwardly extended from the retention body, wherein the extension arm is adapted to fold between a storage position and a hanging position. At the storage position, the extension arm is received in a storage compartment of the retention body to minimize an overall size of the personal item hanger, and at the hanging position, the extension arm is extended at a position that the hooking end of the extension arm is downwardly extended below a bottom surface of the table for hanging the personal item underneath the table.

23 Claims, 9 Drawing Sheets

PERSONAL ITEM HANGER

BACKGROUND OF THE PRESENT INVENTION

1. Field of Invention

The present invention relates to a hanger, and more particularly to a personal item hanger, wherein the personal item hanger is adapted for hanging a personal item underneath the table and for being folded into a compact size for carry and storage.

2. Description of Related Arts

Most people have the same annoyance of securely placing the personal belongings at the public area. For example, a lady will normally put her purse on her lap at the restaurant, which is considered as the most safety location to prevent the purse from being stolen. However, it is not a proper table manner and is uncomfortable for the lady to place the purse between the table and herself. Alternatively, the lady may put her purse on the floor or hang the purse at the back of the chair. However, the purse will be dirty or kicked when the purse is sat on the floor. Thus, when the purse is hung at the back of the chair, the purse is out of her observation and is easily stolen. A student, as another example, will merely put his carrying bag on the desk in the library while using the laptop computer. Therefore, the student will have very limited desktop area of the desktop when the carrying bag is placed on the desk.

A conventional desk hanger is adapted to solve the above problem to hang the personal item at the side of the desk. The conventional table hanger usually is built-in with the desk. However, the table set up at the restaurant may not be incorporated with the built-in type desk hanger. Another type of desk hanger can be detachably coupled with the tabletop of the table to hang the personal item. However, the size of the desk hanger is relatively large such that the user will be willing to carry the desk hanger everywhere, especially the size of the lady's purse is relatively small.

Therefore, in order to meet the demands of the customer needs, it increases not only in its compact size but also in its easy to fold by adding extension arm and sliding slot inside. Furthermore, putting the burglar alarm inside the personal item hanger is quite practical.

SUMMARY OF THE PRESENT INVENTION

A main object of the present invention is to provide a personal item hanger, wherein the personal item hanger is adapted for hanging a personal item underneath the table and for being folded into a compact size for carry and storage.

Another object of the present invention is to provide a personal item hanger, wherein the extension arm is adapted to fold between a hanging position for hanging the personal item underneath the table and a storage position to minimize an overall size of the personal item hanger. Accordingly, the extension arm can be folded by slidably retracting the length thereof, by disassembling into several parts or pivotally folding to minimize the length of the extension arm.

Another object of the present invention is to provide a personal item hanger, which provides an add-on feature for enhancing the practical use of the personal item hanger. In other words, the personal item hanger can incorporate with a mirror case, a time piece, and/or a perfume filling for different users.

Another object of the present invention is to provide a personal item hanger, wherein the personal item hanger comprises an alerting system to wirelessly link between the personal item hanger and the personal item, such that the user is able to immediately be aware of the personal item being removed from the personal item hanger via an alerting system.

Accordingly, in order to achieve above mentioned objects, the present invention provide a personal item hanger for hanging a personal item below a table or the like, comprising:

a retention body for being rested on a top surface of the table; and an extension arm having an adjustable length and including an upper coupling end rotatably coupling with the retention body and a lower hooking end downwardly extended from the retention body, wherein the extension arm is adapted to fold between a storage position and a hanging position. At the storage position, the extension arm is received in a storage compartment of the retention body to minimize an overall size of the personal item hanger, and at the hanging position, the extension arm is extended at a position that the hooking end of the extension arm is downwardly extended below a bottom surface of the table for hanging the personal item underneath the table.

These and other objectives, features, and advantages of the present invention will become apparent from the following detailed description, the accompanying drawings, and the appended claims.

DETAILED DESCRIPTION OF THE PREFERRED EMBODIMENT

Figure 1:
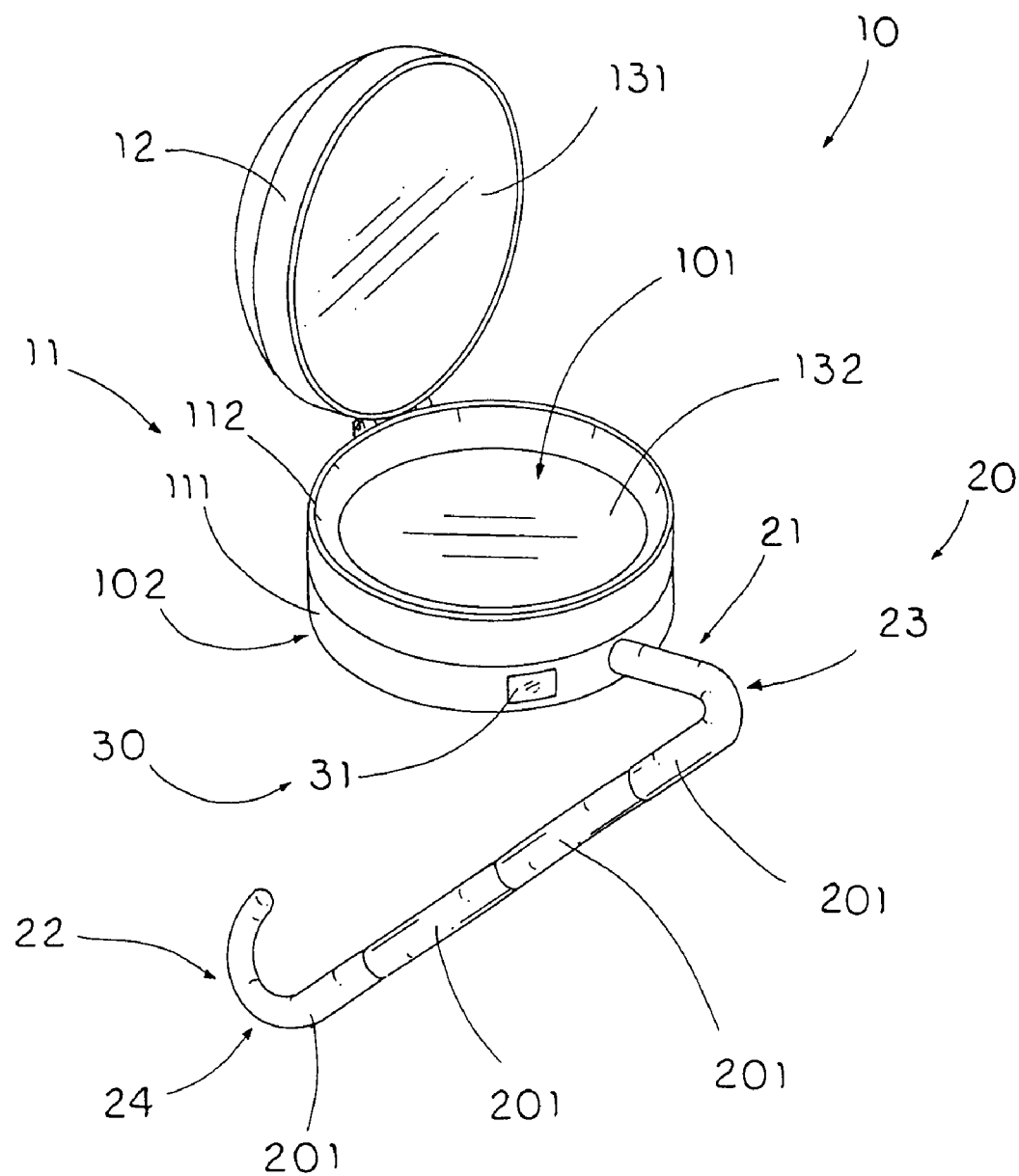
FIG. 1 is a perspective view of a personal item hanger at a hanging position according to a first preferred embodiment of the present invention.

Referring to FIGS. 1 to 4 of the drawing, a personal item hanger according to a first preferred embodiment of the present invention is illustrated, wherein the personal item hanger is adapted for hanging a personal item below a table or the like such as a desk. Accordingly, the personal item of the present invention comprises a retention body 10 and an extension arm 20 retractably extending therefrom.

The retention body 10, which is adapted for being rested on a top surface of the table at a position close to an edge thereof, has a storage compartment 101 and a bottom supporting surface 102 for engaging with the top surface of the table. The retention body 10 has a predetermined weight applying on the top surface of the table.

The extension arm 20, having an adjustable length, comprises an upper coupling end 21 rotatably coupling with the retention body 10 and a lower hooking end 22 downwardly extended from the retention body 10 to define the adjustable length between the coupling end 21 and the hooking end 22. The extension arm 20 is adapted to fold between a storage position and a hanging position, wherein at the storage position, the extension arm 20 is minimized the adjustable height thereof and is received in the storage compartment 101 to minimize an overall size of the personal item hanger, and at the hanging position, the extension arm 20 is extended to maximize the adjustable height thereof at a position that the hooking end 22 of the extension arm 20 is downwardly extended below a bottom surface of the table for hanging the personal item underneath the table.

Figure 2:
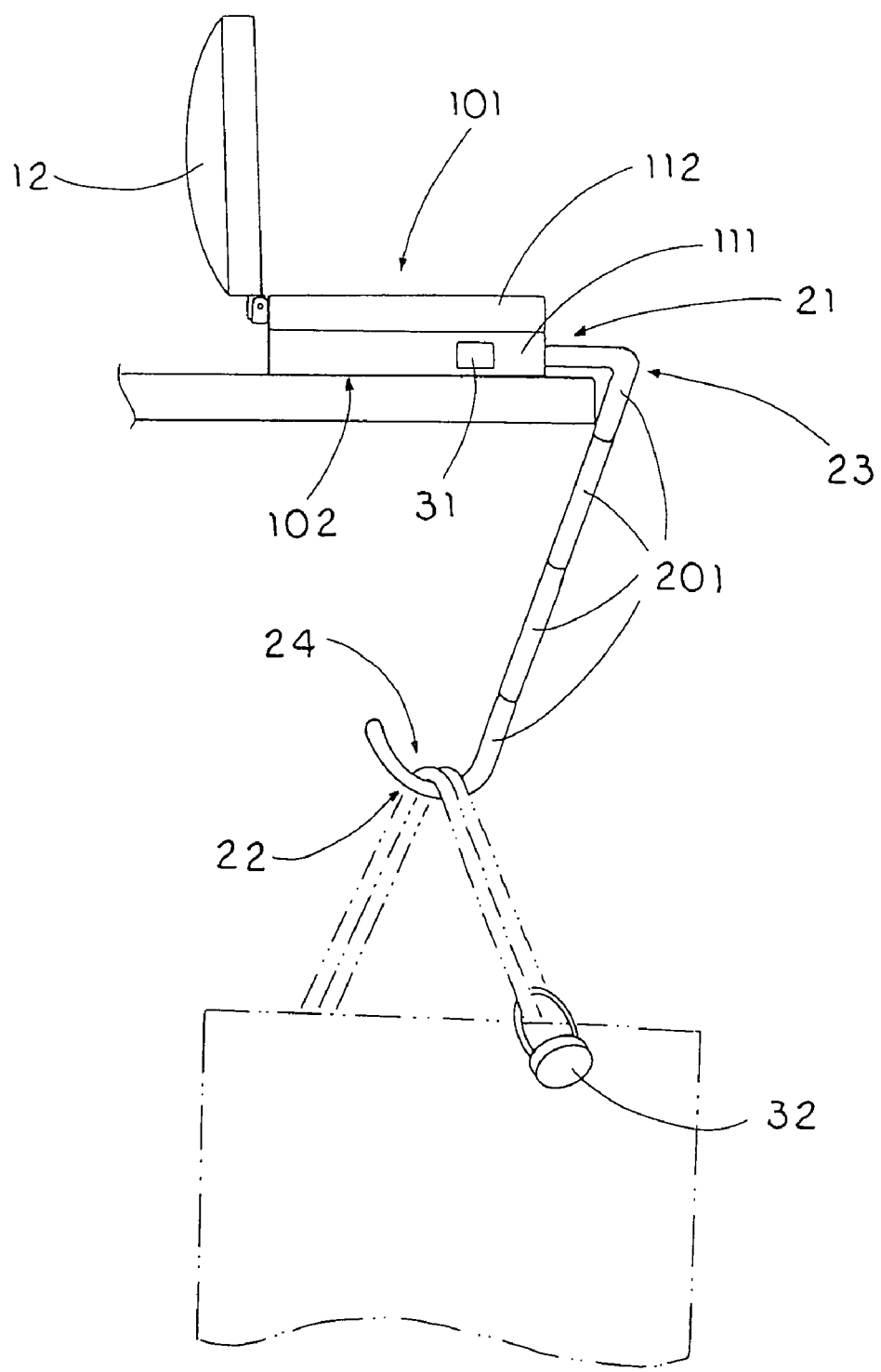
FIG. 2 is a side view of the personal item hanger according to the above first preferred embodiment of the present invention, illustrating a personal item being suspendedly hung underneath the table via the personal item hanger.
Figure 3:
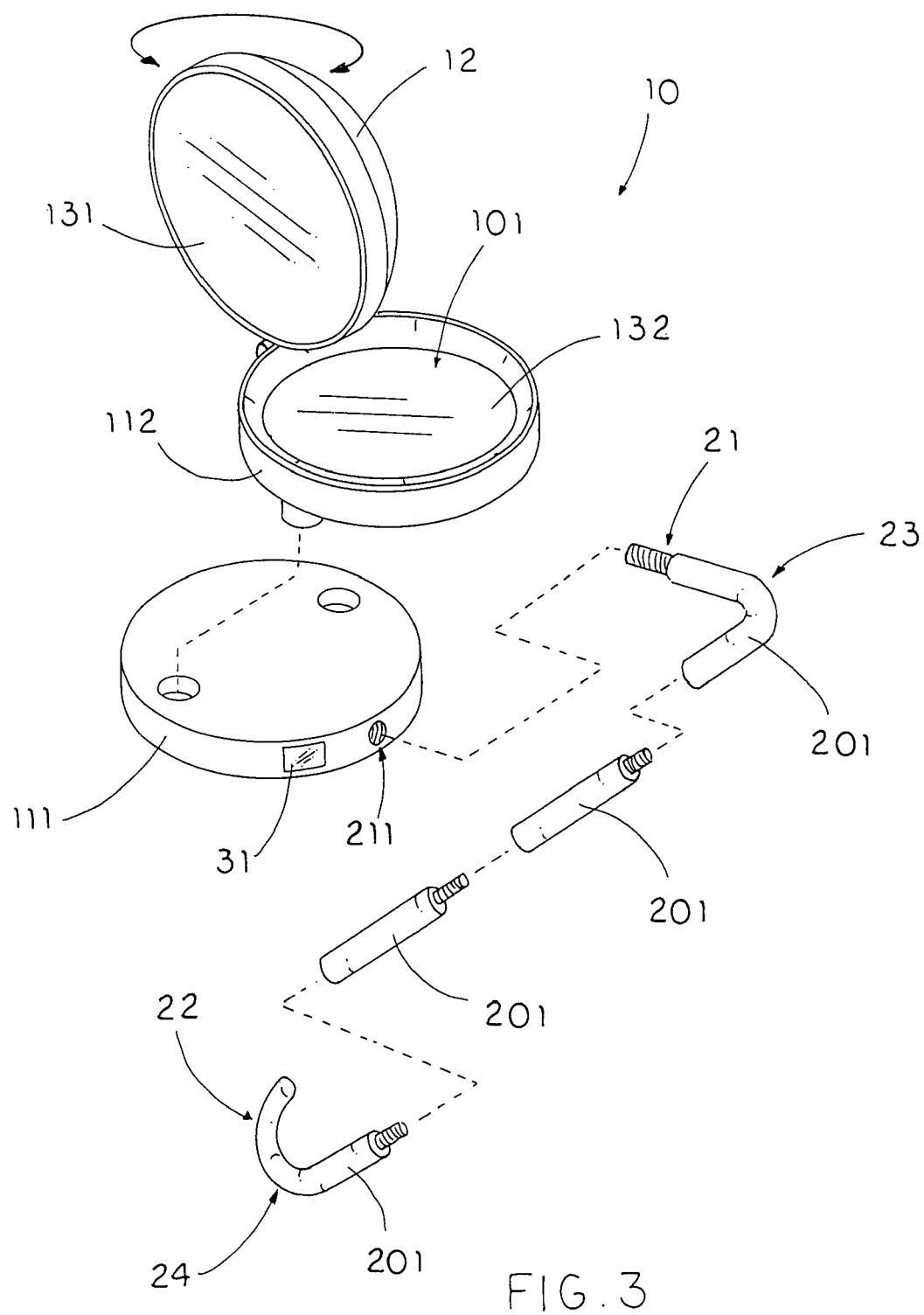
FIG. 3 is an exploded perspective view of the personal item hanger according to the above first preferred embodiment of the present invention, illustrating the extension arm being detached from the retention body.

As shown in FIGS. 1 to 3, the retention body 10, having a circular box shape, comprises a base housing 11 defining the bottom surface 102 thereat, and a cover housing 12 pivotally and rotatably coupling with the base housing 11 to form the storage compartment 101 between the base housing 11 and the cover housing 12 when the cover housing 12 is overlappedly folded on the base housing 12. Therefore, the extension arm 20 is folded to receive in the storage compartment 101 and to enclose between the base housing 11 and the cover housing 12.

The retention body 10 further comprises two mirror panels 131, 132 with different magnifications provided within the storage compartment 101 at the base housing 11 and the cover housing 12 respectively. In other words, one of the mirror panels 131 is provided at the inner side of the base housing 11 while another mirror panel 132 is provided at the inner side of the cover housing 12. The mirror configuration of the personal item hanger is mainly designed for women. Alternatively, a time piece or a perfume filling can be mounted in the retention body 10 as an add-on accessory for the user.

According to the first embodiment, the base housing 11 comprises a seat base 111 detachably coupling with the coupling end 21 of the extension arm 20 and a base member 112 which is detachably mounted on the seat base 111 and is pivotally and rotatably coupled with the cover housing 12 to receive the respective mirror panel 131, such that the base member 112 and the cover housing 12 form a mirror casing to detachably couple with the seat base 111. In other words, the respective mirror panel 131 is provided at the inner side of the base member 112. Accordingly, the base member 112 is coupled with the cover housing 12 via a hinge to allow the cover housing 12 to pivotally and rotatably fold with the base member 112. Therefore, the user, especially for a lady, is able to detach the mirror casing from the seat base 111 while the personal item is kept being suspendedly hung underneath the table via the personal item hanger, as shown in FIG. 2.

It is worth to mention that the base member 112 can be integrally formed at the seat base 111 such that the base housing 11 forms a one-piece structure to rest on the top surface of the table.

The extension arm 20 has an upper angled portion 23 defining at the coupling end 21 thereat and a lower angled portion 24 defining the hooking end 22 thereat such that when the coupling end 21 of the extension arm 20 is coupled with the retention body 10, the hooking end 22 of the extension arm 20 is downwardly extended adjacent to the edge of the table to suspendedly support underneath the table, as shown in FIG. 2. Accordingly, the hooking end 22 of the extension arm 20 is extended underneath the table towards a center of mass of the personal item hanger via the upper angled portion 23 of the extension arm 20, so as to suspendedly hanging the personal item under the table in a stably manner.

As shown in FIG. 3, the extension arm 20 is can be detached from the retention body 10 for being received in the storage compartment 101. Referring to the first embodiment, the coupling end 21 of the extension arm 20 is detachably and rotatably coupling with the retention body 10. A mounting hole 211 having an inner threaded portion is provided at the seat base 112 for detachably coupling with the coupling end 21 of the extension arm 20. A corresponding outer threaded portion of the coupling end 21 of the extension arm 20 is rotatably engaged with the inner threaded portion of the mounting hole 211 to rotatably and detachably couple the coupling end 21 of the extension arm 20 with the retention body 10.

In order to retract the extension arm 20, the extension arm 20 comprises two or more extension shafts 201 detachably attaching with each other end-to-end such that the adjustable length of the extension arm 20 is maximized when the extension shafts 201 are attached to each other end-to-end and is minimized when the extension shafts 201 are detached from each other. Accordingly, the extension arm 20 is received in the storage compartment 101 when the extension arm 20 is detached from the retention body 10 and when the extension shafts 201 are detached from each other. As shown in FIG. 3, each of the extension shafts 201 has an elongated tubular shape and has an outer threaded end and an opposed inner threaded end such that the outer threaded end of the extension shaft 201 is rotatably engaged with the inner threaded end of another extension shaft 201 to couple the extension shafts 201 end-to-end.

Figure 9:
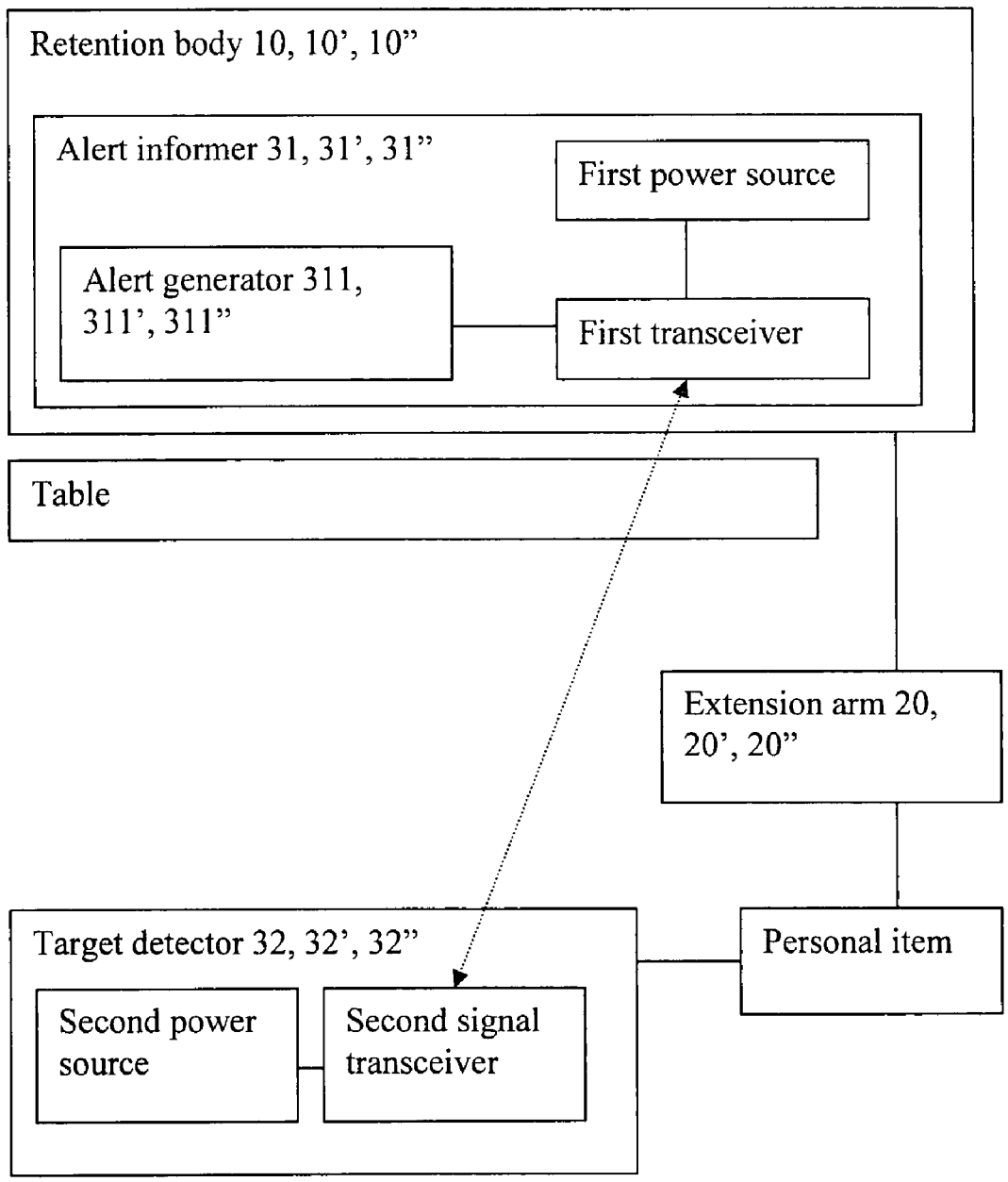
FIG. 9 is a block diagram of an alerting system incorporating with the personal item hanger according to above first to third preferred embodiments of the present invention, illustrating the alert informer wirelessly communicating with the target detector.

As shown in FIGS. 3 and 9, the personal item hanger of the present invention further comprises an alerting system 30 for notifying the personal item being taken away when the personal item is hung underneath the table. The alerting system 30 comprises an alert informer 31 provided at the retention body 10 and a target detector 32, which adapted for being held at the personal item, wirelessly communicating with the alert informer 31.

The alert informer 31 comprises an alert generator 311 mounted to the retention body 10 for generating an alert signal, a first power source, and a first transceiver. Accordingly, the first power source can be a replaceable battery disposed in the retention body 10.

The target detector 32 is wirelessly linked to the alert informer 31 within a detectable range, such that when the target detector 32 is located out of the detectable range, the alert generator of the alert informer 31 generates the alert signal for notifying the personal item being taken away from the hooking end 22 of the extension arm 20. Preferably, the detectable range is set at two feet that when the target detector 32 is located 2 feet away from the alert informer 31, the alert generator 311 is automatically activated to generate the alert signal.

The target detector 32 comprises a second signal transceiver wirelessly linked to the first transceiver of the alert informer 31, and a second power source for power supply.

Accordingly, after the personal item is hung at the hooking end 22 of the extension arm 20, the user is able to activate the alerting system 30 to wirelessly link the target detector 32 with the alert informer 31 such that when the personal item is carried out of the detectable range, the alert signal is instantaneously generated to inform the user. It is worth to mention that the retention body 10 is placed on the top surface of the table and is located close to the user, such that the user is able to be aware of the alert signal.

In order to hang the personal item under the table via the personal item hanger of the present invention, the user is able to rotatably couple the extension shafts 201 end-to-end to form the extension arm 20 with the maximized adjustable length. Then, the coupling end 21 of the extension arm 20 is rotatably coupled with the retention body 10 through the mounting hole 211 at a position that the hooking end 22 of the extension arm 20 is located below the bottom supporting surface 102 of the retention body 10. Therefore, by placing the bottom supporting surface 102 on the top surface of the table, the personal item can be suspendedly hung at the hooking end 22 of the extension arm 20 under the table.

Figure 4:
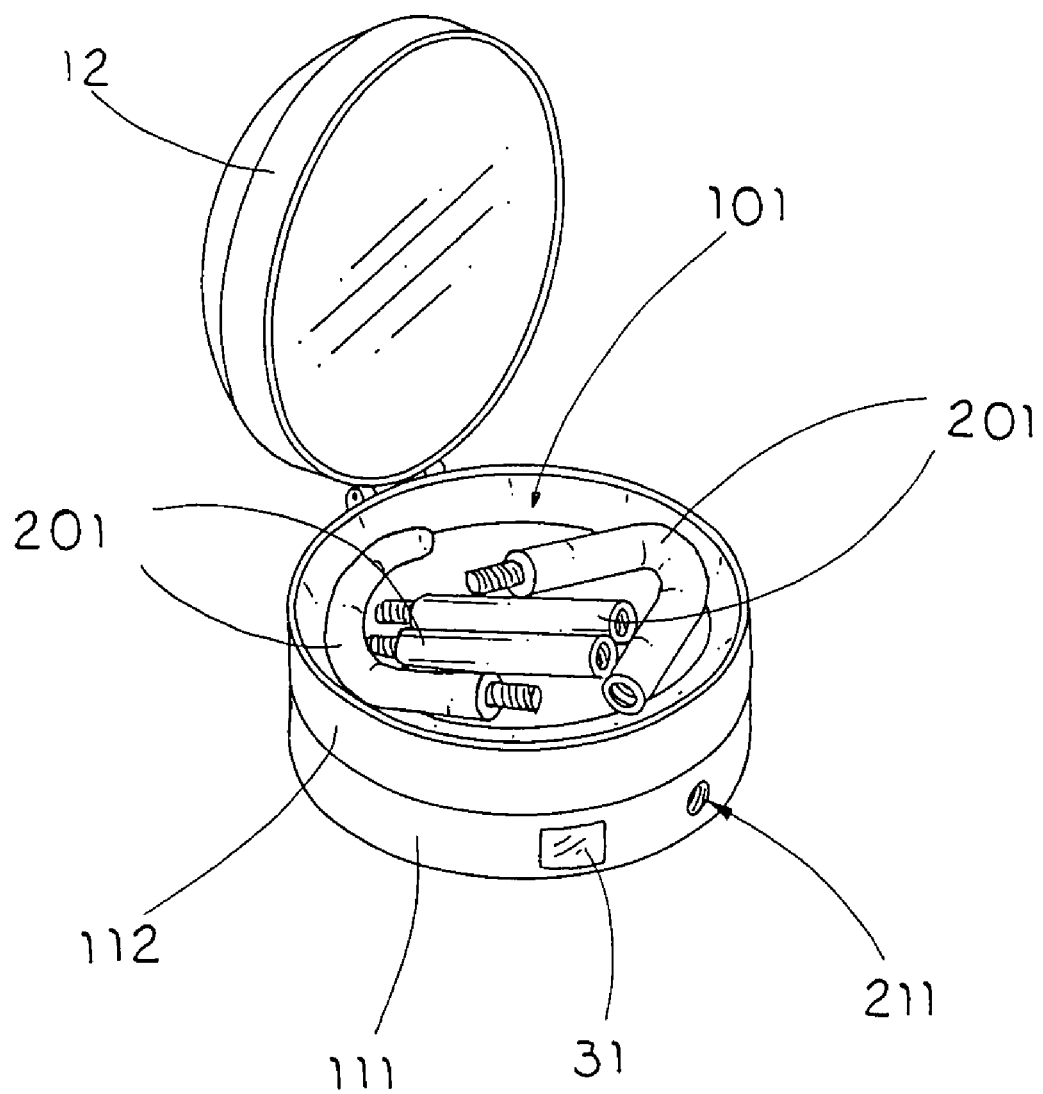
FIG. 4 is perspective view of the personal item hanger at a storage position according to the above first preferred embodiment of the present invention.

Likewise, in order to fold up the personal item hanger of the present invention, the user is able to detach the coupling end 21 of the extension shaft 20 from the retention body 10 and to disassemble the extension shaft 20 into several extension shafts 201. Therefore, the extension shafts 201 are received in the storage compartment 101 as shown in FIG. 4.

Figure 5:
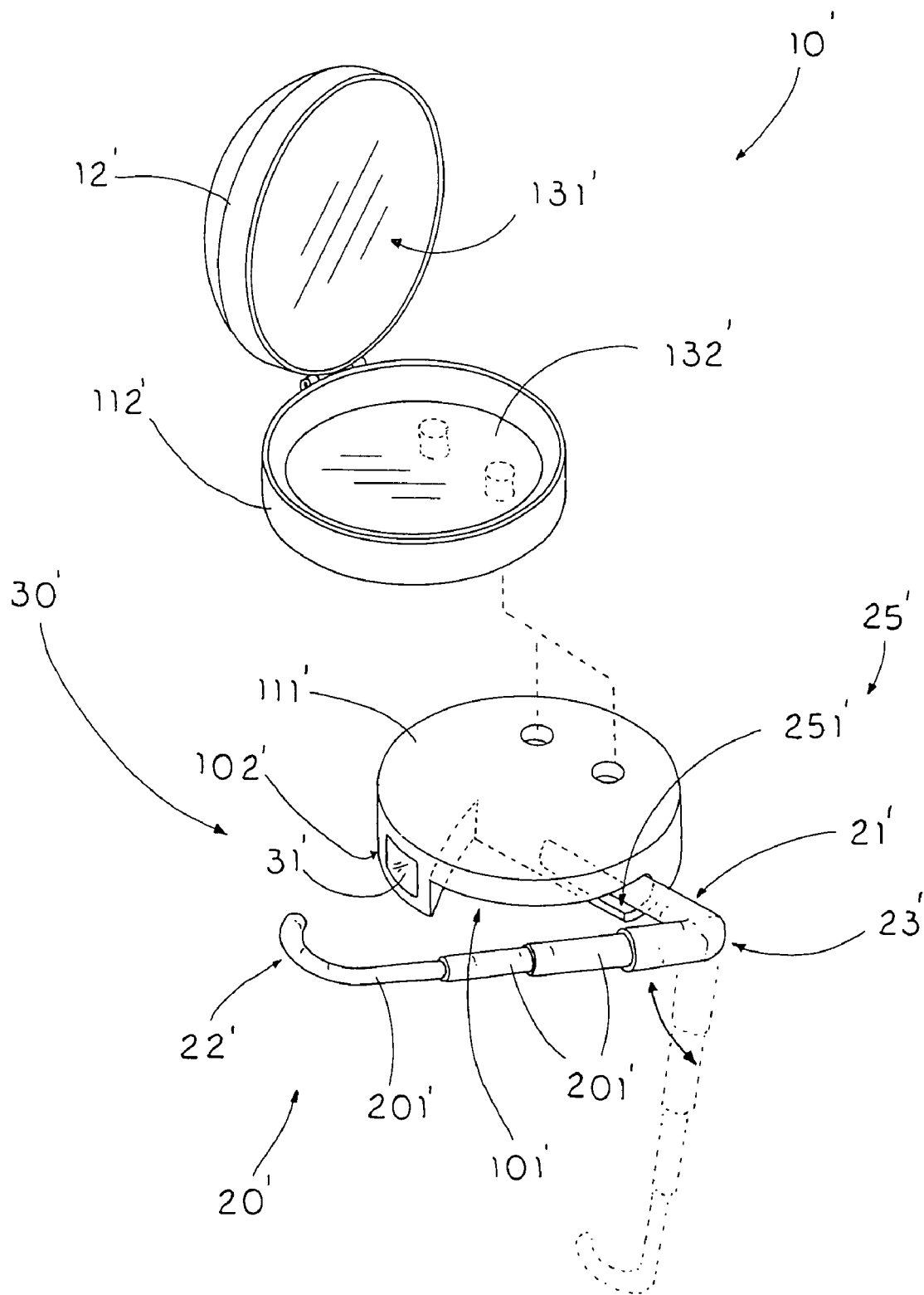
FIG. 5 is a perspective view of a personal item hanger according to the second preferred embodiment of the present invention.
Figure 6:
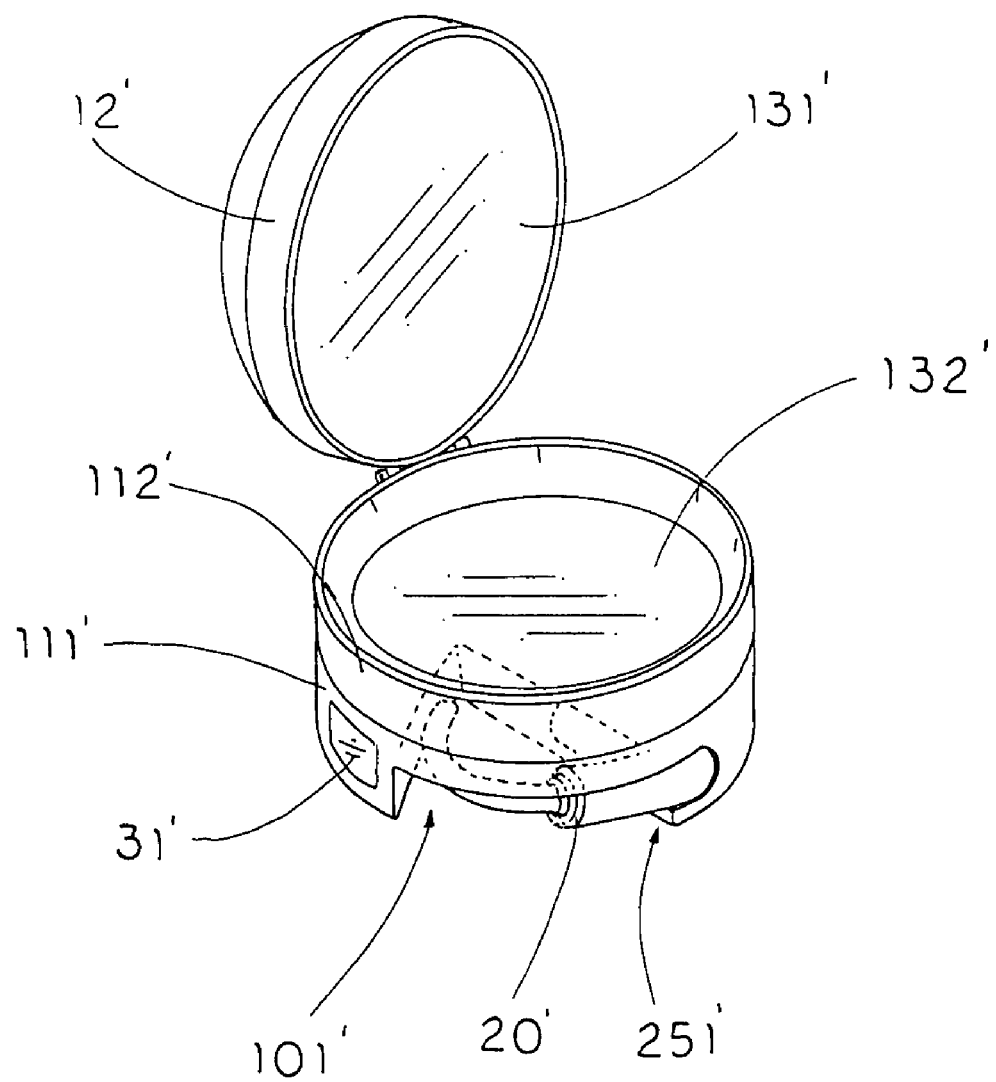
FIG. 6 is a perspective view of the personal item hanger according to the second preferred embodiment of the present invention, illustrating the extension arm being slidably retracted from the hanging position to the storage position.

As shown in FIGS. 5 and 6, a personal item hanger of a second embodiment illustrates an alternative mode of the first embodiment, wherein the personal item hanger has the similar structural configuration of the first embodiment, except the folding structure of the extension arm 20'

According to the second embodiment, the retention body 10' is arranged for being rested on a top surface of the table at a position close to an edge thereof, wherein the retention body 10' has a storage compartment 101' and a bottom supporting surface 102' for engaging with the top surface of the table.

The extension arm 20', having an adjustable length, comprises an upper coupling end 21' rotatably coupling with the retention body 10' and a lower hooking end 22' downwardly extended from the retention body 10' to define the adjustable length between the coupling end 21' and the hooking end 22'. The extension arm 20' is adapted to fold between a storage position and a hanging position, wherein at the storage position, the extension arm 20' is minimized the adjustable height thereof and is received in the storage compartment 101' to minimize an overall size of the personal item hanger, and at the hanging position, the extension arm 20' is extended to maximize the adjustable height thereof at a position that the hooking end 22' of the extension arm 20' is downwardly extended below a bottom surface of the table for hanging the personal item underneath the table.

As shown in FIGS. 5 and 6, the retention body 10', having a circular box shape, comprises a base housing 11' defining the bottom surface 102' thereat, and a cover housing 12' pivotally and rotatably coupling with the base housing 11'.

The retention body 10' further comprises two mirror panels 131', 132' with different magnifications provided within the storage compartment 101' at the base housing 11' and the cover housing 12' respectively. In other words, one of the mirror panels 131' is provided at the inner side of the base housing 11 while another mirror panel 132' is provided at the inner side of the cover housing 12'.

According to the second embodiment, the base housing 11' comprises a seat base 111' rotatably coupling with the coupling end 21' of the extension arm 20' and a base member 112' which is detachably mounted on the seat base 111' and is pivotally and rotatably coupled with the cover housing 12' to receive the respective mirror panel 131', such that the base member 112' and the cover housing 12' form a mirror casing to detachably couple with the seat base 111'. Accordingly, the base member 112' is coupled with the cover housing 12' via a hinge to allow the cover housing 12' to pivotally and rotatably fold with the base member 112'. Therefore, the user, especially for a lady, is able to detach the mirror casing from the seat base 111' while the personal item is kept being suspendedly hung underneath the table via the personal item hanger.

The extension arm 20' has an upper angled portion 23' defining at the coupling end 21' thereat and a lower angled portion 24' defining the hooking end 22' thereat such that when the coupling end 21' of the extension arm 20' is coupled with the retention body 10', the hooking end 22' of the extension arm 20' is downwardly extended adjacent to the edge of the table to suspendedly support underneath the table. Accordingly, the hooking end 22' of the extension arm 20' is extended underneath the table towards a center of mass of the personal item hanger via the upper angled portion 23' of the extension arm 20', so as to suspendedly hanging the personal item under the table in a stably manner.

The extension arm 20' comprises two or more tubular arms 201' slidably and retractably coupling with each other such that the extension arm 20' is adapted to be extended the adjustable length thereof when the coupling end 21' and the hooking end 22' of the extension arm 20' are pulled away from each other and is adapted to be reduced the adjustably length thereof when the coupling end 21' and the hooking end 22' of the extension arm 20' are pushed towards each other. As shown in FIG. 5, the tubular arms 201' are coaxially and slidably coupling with each other such that the extension arm 20' is adapted to be slidably retracted to adjust the adjustable length thereof.

Accordingly, the coupling end 21' of the extension arm 20' is rotatably and slidably coupling with the retention body 10' via a sliding hinge 25', wherein the sliding hinge 25' contains a sliding slot 251' provided at the retention body 10' to slidably engage with the coupling end 21' of the extension arm 20' such that when the coupling end 21' of the extension arm 20' is slid out from the sliding slot 251' at a peripheral edge of the retention base 10' to be freely rotated, the hooking end 22' of the extension arm 20' is adapted to be pulled to extend the adjustable length of the extension arm 20'.

As shown in FIG. 6, the storage compartment 101' is formed at the peripheral edge of the base housing 12' to receive the hooking end 22' of the extension arm 20' when the extension arm 20' is retracted. In other words, after the extension arm 20' is slidably retracted, the extension arm 20' is rotated and slid to receive in the storage compartment 101'.

In addition, the alerting system 30' is incorporated with the retention body 10' for notifying the personal item being taken away when the personal item is hung underneath the table, as shown in FIG. 9. The alerting system 30' comprises an alert informer 31' which comprises an alert generator 311' provided at the retention body 10' for generating an alert signal, and a target detector 32', which adapted for being held at the personal item, wirelessly communicating with the alert informer 31'.

The target detector 32' is wirelessly linked to the alert informer 31' within a detectable range, such that when the target detector 32' is located out of the detectable range, the alert generator of the alert informer 31' generates the alert signal for notifying the personal item being taken away from the hooking end 22' of the extension arm 20'.

Figure 7:
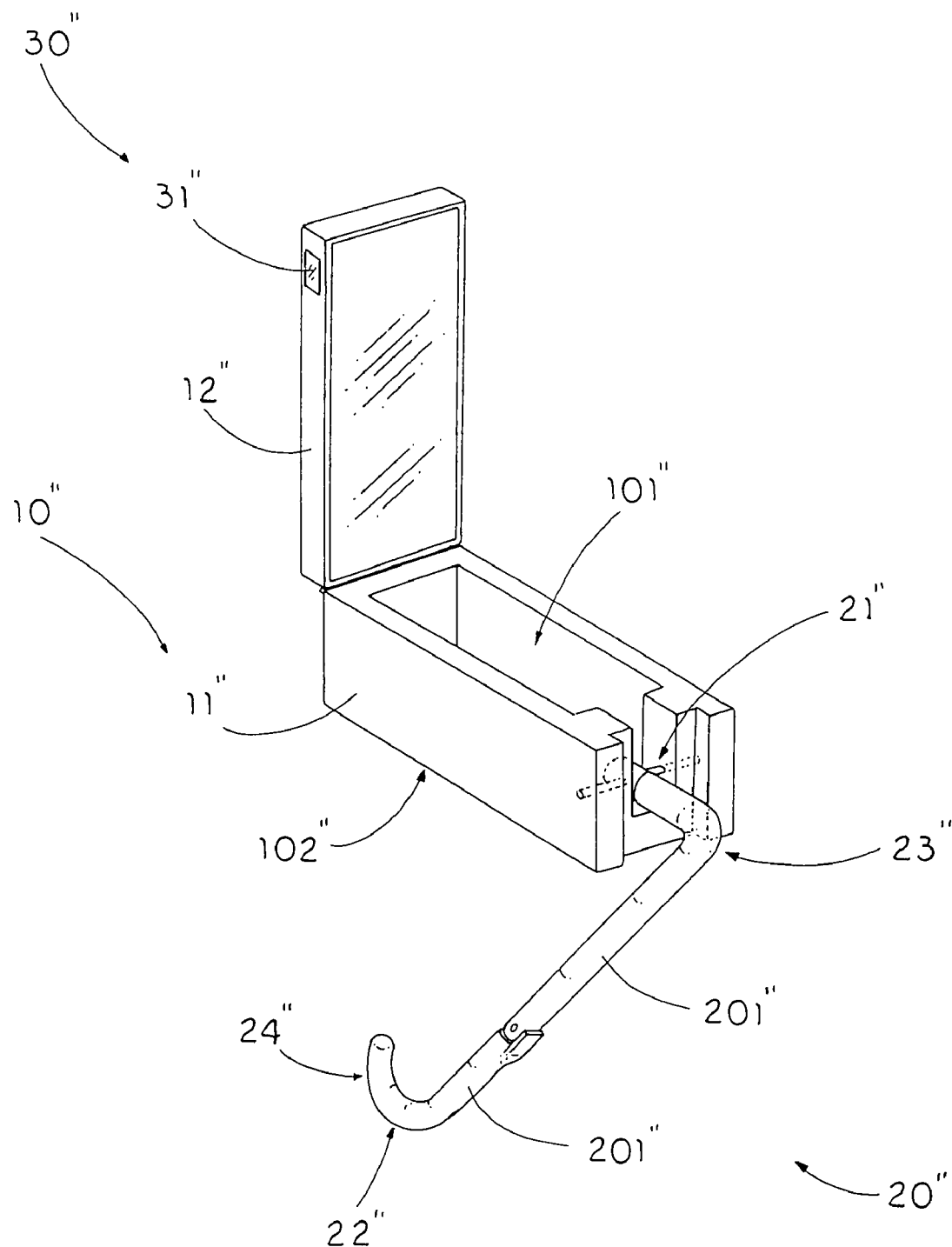
FIG. 7 is a perspective view of a personal item hanger according to a third preferred embodiment of the present invention.

As shown in FIG. 7, a personal item hanger of a third embodiment illustrates another alternative mode of the first embodiment, wherein the personal item hanger also has the similar structural configuration of the first embodiment, except the folding structure of the extension arm 20".

According to the second embodiment, the retention body 10" is arranged for being rested on a top surface of the table at a position close to an edge thereof, wherein the retention body 10" has a storage compartment 101" and a bottom supporting surface 102" for engaging with the top surface of the table.

The extension arm 20", having an adjustable length, comprises an upper coupling end 21" rotatably coupling with the retention body 10" and a lower hooking end 22" downwardly extended from the retention body 10" to define the adjustable length between the coupling end 21" and the hooking end 22". The extension arm 20" is adapted to fold between a storage position and a hanging position, wherein at the storage position, the extension arm 20" is minimized the adjustable height thereof and is received in the storage compartment 101" to minimize an overall size of the personal item hanger, and at the hanging position, the extension arm 20" is extended to maximize the adjustable height thereof at a position that the hooking end 22" of the extension arm 20" is downwardly extended below a bottom surface of the table for hanging the personal item underneath the table.

As shown in FIG. 7, the retention body 10", having a rectangular box shape, comprises a base housing 11" defining the bottom surface 102" thereat, and a cover housing 12" pivotally and rotatably coupling with the base housing 11". The storage compartment 101" is formed between the base housing 11" and the cover housing 12" when said cover housing 12" is overlappedly folded on the base housing 11", so as to receive the extension arm 20".

The extension arm 20" has an upper angled portion 23" defining at the coupling end 21" thereat and a lower angled portion 24" defining the hooking end 22" thereat such that when the coupling end 21" of the extension arm 20" is coupled with the retention body 10", the hooking end 22" of the extension arm 20" is downwardly extended adjacent to the edge of the table to suspendedly support underneath the table. Accordingly, the hooking end 22" of the extension arm 20" is extended underneath the table towards a center of mass of the personal item hanger via the upper angled portion 23" of the extension arm 20", so as to suspendedly hanging the personal item under the table in a stably manner.

Figure 8A:
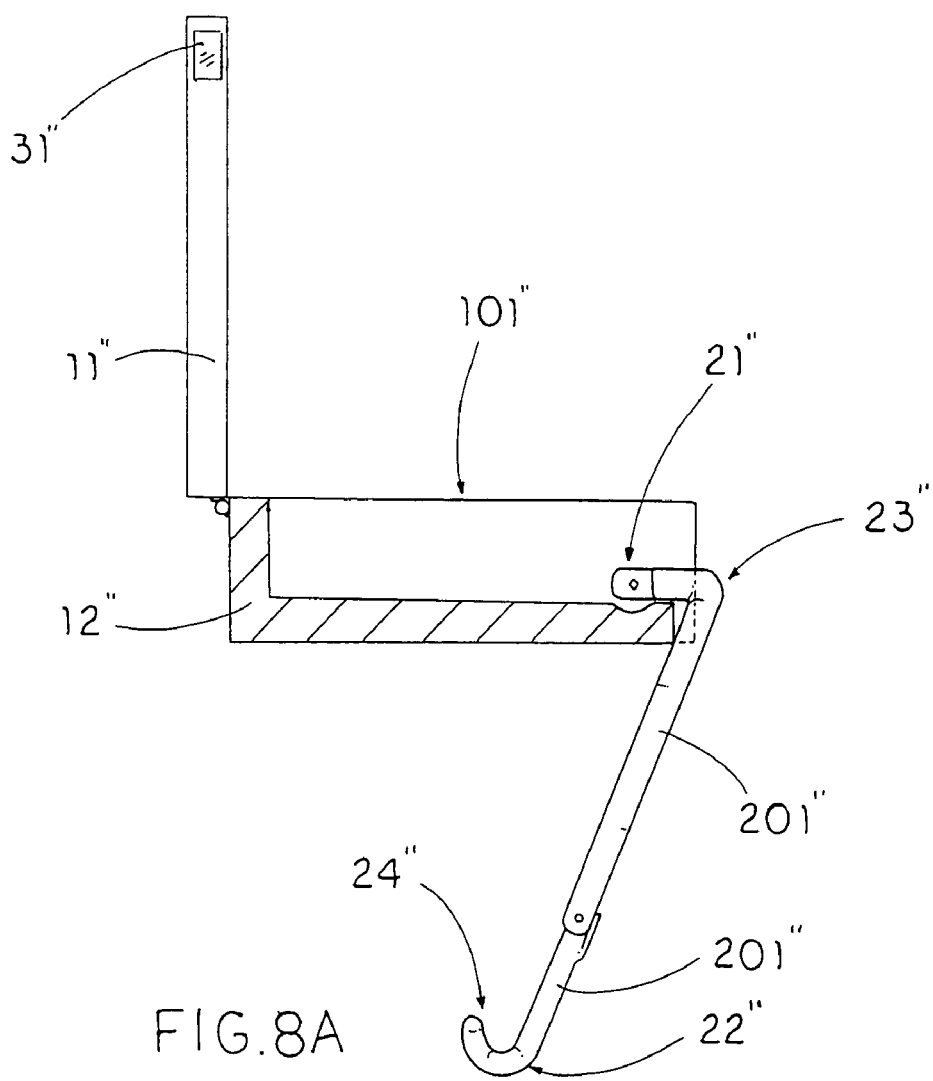
FIGS. 8A and 8B are sectional views of the personal item hanger being pivotally folded at the storage position according to the third preferred embodiment of the present invention.
Figure 8B:
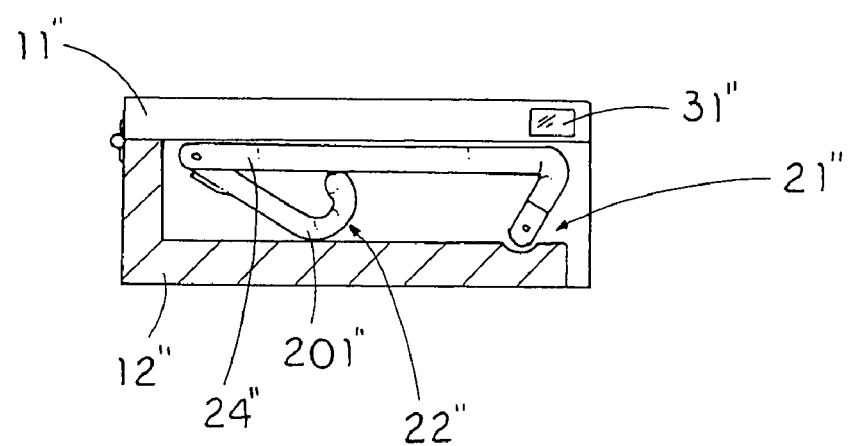

As shown in FIGS. 8A and 8B, the coupling end 21" of the extension arm 20" is pivotally and rotatably coupling with the retention body 10" via a pivot joint, wherein the extension arm 20" comprises two or more pivot arms 201" pivotally coupling with each other end-to-end such that the extension arm 20" is received in the storage compartment 101" when the pivot arms 201" are pivotally folded with each other. Accordingly, each of the pivot arms 201" is only pivotally folded at one direction such that when the pivot arms 201" is pivotally folded to aligned with each other end-to-end, the extension arm 20" is formed to downwardly extend from the retention body 10".

As shown in FIG. 9, the alerting system 30" is incorporated with the retention body 10" for notifying the personal item being taken away when the personal item is hung underneath the table. The alerting system 30" comprises an alert informer 31" which comprises an alert generator 311" provided at the retention body 10" for generating an alert signal, and a target detector 32", which adapted for being held at the personal item, wirelessly communicating with the alert informer 31".

The target detector 32" is wirelessly linked to the alert informer 31" within a detectable range, such that when the target detector 32" is located out of the detectable range, the alert generator of the alert informer 31" generates the alert signal for notifying the personal item being taken away from the hooking end 22" of the extension arm 20".

According to the first to third embodiments, the retention body 10, 10', 10" is adapted to be stably rested on the top surface of the table wherein the extension arm 20, 20', 20" is retractably and downwardly extended from the retention body 10, 10', 10" at a position underneath of the table for suspendedly hanging the personal item thereunder. Accordingly, the extension arm 20, 20', 20" can be retracted to minimize the adjustable length thereof and can be received in the storage compartment 101, 101', 101" by detaching the extension shafts 201 of the extension arm 20 as illustrated in the first embodiment, by slidably retracting the tubular arms 201' of the extension arm 20' as illustrated in the second embodiment, or by pivotally folding the pivot arms 201" of the extension arm 20" as illustrated in the third embodiment. In addition, the shape of the retention body 10, 10', 10" can be configured to have different shapes such as circular shape or rectangular shape.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A personal item hanger for hanging a personal item below a table, comprising:

a retention body, which is adapted for being rested on a top surface of said table at a position close to an edge thereof, having a storage compartment and a bottom supporting surface for engaging with said top surface of said table; and an extension arm, having an adjustable length, which comprises an upper coupling end rotatably coupling with said retention body and a lower hooking end downwardly extended from said retention body to define said adjustable length between said coupling end and said hooking end, wherein said extension arm is adapted to fold between a storage position and a hanging position, wherein at said storage position, said extension arm is minimized said adjustable height thereof and is received in said storage compartment to minimize an overall size of said personal item hanger, and at said hanging position, said extension arm is extended to maximize said adjustable height thereof at a position that said hooking end of said extension arm is downwardly extended below a bottom surface of said table for hanging said personal item underneath said table.

2. The personal item hanger, as recited in claim 1, wherein said coupling end of said extension arm is detachably and rotatably coupling with said retention body, wherein said extension arm comprises two or more extension shafts detachably attaching with each other end-to-end such that said extension arm is received in said storage compartment when said extension arm is detached from said retention body and when said extension shafts are detached from each other.

3. The personal item hanger, as recited in claim 2, wherein said retention body comprises a base housing defining said bottom surface thereat, a cover housing pivotally and rotatably coupling with said base housing to form said storage compartment between said base housing and said cover housing when said cover housing is overlappedly folded on said base housing, and two mirror panels with different magnifications provided within said storage compartment at said base housing and said cover housing respectively.

4. The personal item hanger, as recited in claim 3, wherein said base housing comprises a seat base detachably coupling with said coupling end of said extension arm and a base member which is detachably mounted on said seat base and is pivotally and rotatably coupled with said cover housing to receive said respective mirror panel, such that said base member and said cover housing form a mirror casing to detachably couple with said seat base.

5. The personal item hanger, as recited in claim 3, wherein said extension arm has an upper angled portion defining at said coupling end thereat and a lower angled portion defining said hooking end thereat such that when said coupling end of said extension arm is coupled with said retention body, said hooking end of said extension arm is downwardly extended adjacent to said edge of said table to suspendedly support underneath said table.

6. The personal item hanger, as recited in claim 5, further comprising an alerting system which comprises an alert informer comprising an alert generator mounted to said retention body for generating an alert signal, and a target detector adapted for being held at said personal item, wherein said target detector is wirelessly linked to said alert informer within a detectable range, such that when said target detector is located out of said detectable range, said alert generator of said alert informer generates said alert signal for notifying said personal item being taken away from said hooking end of said extension arm.

7. The personal item hanger, as recited in claim 1, wherein said retention body comprises a base housing defining said bottom surface thereat, a cover housing pivotally and rotatably coupling with said base housing to form said storage compartment between said base housing and said cover housing when said cover housing is overlappedly folded on said base housing, and two mirror panels with different magnifications provided within said storage compartment at said base housing and said cover housing respectively.

8. The personal item hanger, as recited in claim 7, wherein said base housing comprises a seat base detachably coupling with said coupling end of said extension arm and a base member which is detachably mounted on said seat base and is pivotally and rotatably coupled with said cover housing to receive said respective mirror panel, such that said base member and said cover housing form a mirror casing to detachably couple with said seat base.

9. The personal item hanger, as recited in claim 1, wherein said extension arm comprises two or more tubular arms slidably and retractably coupling with each other such that said extension arm is adapted to be extended said adjustable length thereof when said coupling end and said hooking end of said extension arm are pulled away from each other and is adapted to be reduced said adjustably length thereof when said coupling end and said hooking end of said extension arm are pushed towards each other.

10. The personal item hanger, as recited in claim 9, wherein said coupling end of said extension arm is rotatably and slidably coupling with said retention body via a sliding hinge, wherein said sliding hinge contains a sliding slot provided at said retention body to slidably engage with said coupling end of said extension arm such that when said coupling end of said extension arm is slid out from said sliding slot at a peripheral edge of said retention base to be freely rotated, said hooking end of said extension arm is adapted to be pulled to extend said adjustable length of said extension arm.

11. The personal item hanger, as recited in claim 10, wherein said retention body comprises a base housing defining said bottom surface thereat, a cover housing pivotally and rotatably coupling with said base housing and forming said storage compartment at said peripheral edge of said base housing to receive said hooking end of said extension arm when said extension arm is retracted, and two mirror panels with different magnifications provided within said storage compartment at said base housing and said cover housing respectively.

12. The personal item hanger, as recited in claim 11, wherein said extension arm has an upper angled portion defining at said coupling end thereat and a lower angled portion defining said hooking end thereat such that when said coupling end of said extension arm is coupled with said retention body, said hooking end of said extension arm is downwardly extended adjacent to said edge of said table to suspendedly support underneath said table.

13. The personal item hanger, as recited in claim 12, further comprising an alerting system which comprises an alert informer comprising an alert generator mounted to said retention body for generating an alert signal, and a target detector adapted for being held at said personal item, wherein said target detector is wirelessly linked to said alert informer within a detectable range, such that when said target detector is located out of said detectable range, said alert generator of said alert informer generates said alert signal for notifying said personal item being taken away from said hooking end of said extension arm.

14. The personal item hanger, as recited in claim 9, wherein said retention body comprises a base housing defining said bottom surface thereat, a cover housing pivotally and rotatably coupling with said base housing and forming said storage compartment at said peripheral edge of said base housing to receive said hooking end of said extension arm when said extension arm is retracted, and two mirror panels with different magnifications provided within said storage compartment at said base housing and said cover housing respectively.

15. The personal item hanger, as recited in claim 14, wherein said base housing comprises a seat base detachably coupling with said coupling end of said extension arm and a base member which is detachably mounted on said seat base and is pivotally and rotatably coupled with said cover housing to receive said respective mirror panel, such that said base member and said cover housing form a mirror casing to detachably couple with said seat base.

16. The personal item hanger, as recited in claim 11, wherein said base housing comprises a seat base detachably coupling with said coupling end of said extension arm and a base member which is detachably mounted on said seat base and is pivotally and rotatably coupled with said cover housing to receive said respective mirror panel, such that said base member and said cover housing form a mirror casing to detachably couple with said seat base.

17. The personal item hanger, as recited in claim 1, wherein said coupling end of said extension arm is pivotally and rotatably coupling with said retention body, wherein said extension arm comprises two or more pivot arms pivotally coupling with each other end-to-end such that said extension arm is received in said storage compartment when said pivot arms are pivotally folded with each other.

18. The personal item hanger, as recited in claim 17, wherein said retention body comprises a base housing defining said bottom surface thereat, and a cover housing pivotally and rotatably coupling with said base housing and forming said storage compartment at a bottom portion of said base housing to receive said extension arm when said extension arm is pivotally folded.

19. The personal item hanger, as recited in claim 18, wherein said extension arm has an upper angled portion defining at said coupling end thereat and a lower angled portion defining said hooking end thereat such that when said coupling end of said extension arm is coupled with said retention body, said hooking end of said extension arm is downwardly extended adjacent to said edge of said table to suspendedly support underneath said table.

20. The personal item hanger, as recited in claim 19, further comprising an alerting system which comprises an alert informer comprising an alert generator mounted to said retention body for generating an alert signal, and a target detector adapted for being held at said personal item, wherein said target detector is wirelessly linked to said alert informer within a detectable range, such that when said target detector is located out of said detectable range, said alert generator of said alert informer generates said alert signal for notifying said personal item being taken away from said hooking end of said extension arm.

21. The personal item hanger, as recited in claim 18, wherein said cover housing pivotally coupling with said base housing to form said storage compartment between said base housing and said cover housing when said cover housing is overlappedly folded on said base housing, so as to receive said extension arm when said extension arm is pivotally folded.

22. The personal item hanger, as recited in claim 1, wherein said extension arm has an upper angled portion defining at said coupling end thereat and a lower angled portion defining said hooking end thereat such that when said coupling end of said extension arm is coupled with said retention body, said hooking end of said extension arm is downwardly extended adjacent to said edge of said table to suspendedly support underneath said table.

23. The personal item hanger, as recited in claim 22, further comprising an alerting system which comprises an alert informer comprising an alert generator mounted to said retention body for generating an alert signal, and a target detector adapted for being held at said personal item, wherein said target detector is wirelessly linked to said alert informer within a detectable range, such that when said target detector is located out of said detectable range, said alert generator of said alert informer generates said alert signal for notifying said personal item being taken away from said hooking end of said extension arm.

\* \* \* \* \*